United States Patent Office 3,689,444
Patented Sept. 5, 1972

3,689,444
LATENT CATALYSTS FOR ONE-COMPONENT
EPOXY RESIN/ANHYDRIDE COMPOSITIONS
Norman Gilbert Wolfe, New Albany, Ind., assignor to
Celanese Coatings Company, New York, N.Y.
No Drawing. Filed Apr. 23, 1971, Ser. No. 137,040
Int. Cl. C08g 30/12; C08h 9/00
U.S. Cl. 260—18 EP                    13 Claims

ABSTRACT OF THE DISCLOSURE

Curable epoxy resin/anhydride compositions which cure tack-free and a process for preparing same are provided, the compositions comprising (a) an epoxy resin, (b) a dicarboxylic acid anhydride curing agent, and (c) an accelerator which is a mixture of a zinc salt of an aliphatic monocarboxylic acid and at least one metal salt of an aliphatic monocarboxylic acid wherein the metal is selected from the group consisting of lithium, manganese, and cobalt. The process comprises the steps of (a) mixing the accelerator with the curing agent at a temperature in the range of from about 200 to about 400 degrees Fahrenheit, and (b) adding the epoxy resin after cooling the accelerator/curing agent mixture to about 100 degrees Fahrenheit. The resultant epoxy resin/anhydride compositions are especially useful as encapsulating and impregnating compounds for electrical components.

BACKGROUND OF THE INVENTION

This invention relates to heat-curable epoxy resin/anhydride compositions which exhibit latency at room temperature. More particularly, this invention relates to epoxy resin/anhydride compositions, the air-exposed surfaces of which cure tack free at temperatures below about 300 degrees Fahrenheit.

Epoxy resins have been combined with a wide variety of curing agents to give compositions which are useful in the preparation of industrial castings, surface coatings, high-strength adhesives, laminates, and impregnating and encapsulating compounds. In general, suitable curing agents are either basic or acidic, and include Lewis bases, inorganic bases, primary amines, secondary amines, amides, carboxylic acid anhydrides, dibasic organic acids, phenols, and Lewis acids.

Particularly useful curing agents, especially for the preparation of impregnating and encapsulating compounds, are the dicarboxylic acid anhydrides. Such curing agents give cured epoxy resin compositions having good physical, electrical, and chemical properties. The liquid dicarboxylic acid anhydrides are especially useful, since they are readily blended with epoxy resins to form curable mixtures. In the absence of a catalyst or accelerator, however, such mixtures generally require heating at temperatures above about 300 degrees Fahrenheit for 16 hours or more in order to cure with satisfactory properties. Catalysts, such as tertiary amines, will accelerate the curing of epoxy resin/anhydride mixtures; useful properties are obtained after 8 hours or less at temperatures as low as 250 degrees Fahrenheit. However, such catalyzed systems slowly react at ambient temperature and consequently have working lives of less than about one week. Thus the epoxy resin/anhydride systems in general use are multi-package systems which require blending together just prior to use.

State-of-the-art, single-component epoxy resin/anhydride systems often cure with a residual tack on air-exposed surfaces, especially at cure temperatures below about 300 degrees Fahrenheit. Although such tack often can be eliminated by curing at temperatures higher than about 300 degrees Fahrenheit, such temperatures may damage the substrate, especially when encapsulating or impregnating electrical components, and result in high shrinkage which often causes the cracking of the encapsulant.

SUMMARY OF THE INVENTION

It is therefore an object of the present invention to provide epoxy resin/anhydride compositions, the air-exposed surfaces of which cure tack free within 8 hours at temperatures as low as 230 degrees Fahrenheit.

It is a further object of the present invention to provide epoxy resin/anhydride compositions which contain accelerators and yet are stable at ambient temperature for at least one month and generally for three to six months or more.

Still another object is to provide a process for the preparation of the room temperature-stable curable epoxy resin/anhydride compositions of the present invention.

These and other objects will be apparent to those skilled in the art from a consideration of the specification and claims which follow.

In accordance with the present invention, room temperature-stable, heat-curable, single-package epoxy resin/anhydride compositions are provided which comprise (a) an epoxy resin, (b) a dicarboxylic acid anhydride curing agent, and (c) an accelerator which is a mixture of a zinc salt of an aliphatic monocarboxylic acid and at least one metal salt of an aliphatic monocarboxylic acid wherein the metal is selected from the group consisting of lithium, manganese, and cobalt.

The epoxy resin/anhydride compositions of the present invention are prepared by the process which comprises the steps of (a) mixing said accelerator with said curing agent at a temperature in the range of from about 200 to about 400 degrees Fahrenheit, and (b) adding said epoxy resin after cooling the mixture obtained in (a) to less than about 100 degrees Fahrenheit.

DETAILED DESCRIPTION OF THE INVENTION

The epoxy resins useful in the present invention generally are epoxy resins which contain more than one 1,2-epoxide group per molecule. Typical of such epoxy resins are the glycidyl ethers of polyhydric phenols which generally are obtained by reacting a polyhydric phenol with epichlorohydrin in the presence of alkali. Suitable polyhydric phenols are those which contain at least two phenolic hydroxy groups and no other groups which are reactive with epoxide groups. Such polyhydric phenols can be mononuclear, polynuclear, condensed nuclear, or mono- or polyaromatic-substituted compounds. Examples of suitable polyhydric phenols include pyrocatechol; resorcinol; hydroquinone; 2,3-dimethylhydroquinone; 2,5-dimethylhydroquinone; 3-methoxypyrocatechol; 3-methylpyrocatechol; 4 - amylresorcinol; 4,5 - dimethylresorcinol; 2,2'-dihydroxybiphenyl; 2,4'-dihydroxybiphenyl; 4,4'-dihydroxybiphenyl; 3 - hydroxyphenyl ether; 4 - hydroxyphenyl ether; 3-hydroxyphenyl; 4-hydroxyphenyl ether; 4-hydroxyphenyl sulfone; bis(4-hydroxyphenyl)methane; 1,2 - bis(4-hydroxyphenyl)ethane; 2,2' - dihydroxybenzophenone; 2,4' - dihydroxybenzophenone; 4,4' - dihydroxybenzophenone; 2,2-bis(4-hydroxyphenyl)propane; pyrogallol; phloroglucinol; phenol/formaldehyde resins; and the like.

The preferred glycidyl ethers of polyhydric phenols are the glycidyl polyethers of 2,2-bis(4-hydroxyphenyl) propane, commonly known as Bisphenol A. Such glycidyl polyethers are described in U.S. Pats. 2,582,985; 2,467,171; and 2,801,227.

Other suitable epoxy resins are the glycidyl ethers of polyhydric alcohols, which glycidyl ethers are prepared by reacting a polyhydric alcohol with epichlorohydrin in the presence of an acidic catalyst such as boron trifluoride and subsequently treating the resulting product with an alkaline dehydrohalogenating agent. Included among the suitable polyhydric alcohols which can be used are ethylene glycol; propylene glycol; 1,2-butanediol; 1,3-butanediol; 1,4-butanediol; 3-methyl-1,3-butanediol; 2,3-hexanediol; 3,4-hexanediol; 1,6-hexanediol; 3,4-diethyl-3,4-hexanediol; diethylene glycol; triethyleneglycol; glycerine; pentaerythritol; trimethylolethane; trimethylolpropane; trimethylolbutane; and the like.

Still other suitable epoxy resins are the epoxidized cycloaliphatic olefins and derivatives thereof, frequently obtainable by organic peracid oxidation of the olefins. Examples of epoxidized cycloaliphatic olefins and derivatives include, among others, 4-(1,2-epoxyethyl)-1,2-epoxycyclohexane;
1,2:8,9-diepoxy-p-methane;
2,2-bis(3,4-epoxycyclohexyl)propane;
2,3-epoxycyclopentyl ether;
dicyclopentadiene dioxide;
1,2-epoxy-6-(2,3-epoxypropoxyl)-4,7-methanohexahydroindane;
4-(2,3-epoxycyopentyl)phenyl 2,3-epoxypropyl ether;
1-[4-(2,3-epoxypropoxy)phenyl]-5,6-epoxy-4,7-methanohexahydroindane;
1,2-bis[5-(1,2-epoxy-4,7-methanohexahydroindanyloxy)] ethane;
(3,4-epoxycyclohexyl)methyl 3,4-epoxycyclohexanecarboxylate;
(3,4-epoxy-6-methylcyclohexyl)methyl 3,4-epoxy-6-methylcyclohexanecarboxylate;
3-(3,4-epoxycyclohexyl)-8,9-epoxy-2,4-dioxaspiro[5.5] undecane; and
bis[(3,4-epoxy-6-methylcyclohexyl)-methyl] adipate.

The use of mixtures of epoxy resins is within the scope of the present invention. That is, the epoxy resin component may consist of a single epoxy resin, two or more epoxy resins from the same general class, or at least one epoxy resin from each of two or more general classes.

Furthermore, the epoxy resin component may contain up to about 40 weight percent, based on the total amount of epoxy resins employed, of one or more aliphatic or aromatic monoepoxide diluents. Examples of suitable diluents include propyl glycidyl ether; butyl glycidyl ether; isobutyl glycidyl ether; amyl glycidyl ether; nonyl glycidyl ether; phenyl glycidyl ether; 2-methylphenyl glycidyl ether; 4-t-butylphenyl glycidyl ether; 3-biphenylyl glycidyl ether; 4-biphenylyl glycidyl ether; and the like.

Thus the term "epoxy resin" is meant to include epoxy resins per se and mixtures thereof, and modified epoxy resins wherein the modifiers, i.e., monoepoxide diluents, consititute less than about 40 weight percent, based on the total amount of epoxy resins per se employed. Additionally, any epoxy resin suitable for use in the present invention shall have a viscosity at 77 degrees Fahrenheit of less than about 200,000 cps. Accordingly, epoxy resins per se may be solids provided such resins are either mixed with at least one additional epoxy resin or modified so that a liquid epoxy resin component is obtained having a viscosity of less than about 200,000 cps. In fact, epoxy resin mixtures or modified epoxy resins may have viscosities ranging from less than about 200,000 cps. to about 200 cps. Whether modified or unmodified, it is preferred that epoxy resins per se have viscosities in the range of from about 200 to about 20,000 cps.

The term "dicarboxylic acid anhydride curing agent" is meant to include both a single dicarboxylic acid anhydride and mixtures of two or more dicarboxylic acid anhydrides. While the use of liquid dicarboxylic acid anhydrides is preferred, solid dicarboxylic acid anhydrides melting below about 212 degrees Fahrenheit also can be employed individually. However, mixtures of dicarboxylic acid anhydrides can utilize dicarboxylic acid anhydrides melting at temperatures as high as about 470 degrees Fahrenheit or higher, provided the resulting mixture is either liquid or melts below about 212 degrees Fahrenheit.

Chemically, the suitable dicarboxylic acid anhydrides are aliphatic, cycloaliphatic, or aromatic, and contain a single anhydride function derived from two carboxylic acid groups. Examples of dicarboxylic acid anhydrides which may be used singly include cyclohexane-1,2-dicarboxylic acid anhydride,
1-cyclohexene-1,2-dicarboxylic acid anhydride,
2-cyclohexene-1,2-dicarboxylic acid anhydride,
3-cyclohexene-1,2-dicarboxylic acid anhydride,
4-cyclohexene-1,2-dicarboxylic acid anhydride,
1-methyl-2-cyclohexene-1,2-dicarboxylic acid anhydride,
1-methyl-4-cyclohexene-1,2-dicarboxylic acid anhydride,
3-methyl-4-cyclohexene-1,2-dicarboxylic acid anhydride,
4-methyl-4-cyclohexene-1,2-dicarboxylic acid anhydride, Nadic Methyl Anhydride (trademark of Allied Chemical Corporation, Plastics Division, New York, for methylbicyclo[2.2.1] - heptene-2,3-dicarboxylic acid anhydride), dodecenylsuccinic anhydride, and the like. Examples of dicarboxylic acid anhydrides, having melting points above about 100 degrees centigrade, which may be mixed with one or more of the foregoing dicarboxylic acid anhydrides include chlorendic anhydride, phthalic anhydride, succinic anhydride, 4-methyl-1-cyclohexene-1,2-dicarboxylic acid anhydride, and the like. The following examples are given to illustrate suitable binary mixtures of dicarboxylic acid anhydrides: 85 weight percent cyclohexane-1,2-dicarboxylic acid anhydrides/15 weight percent phthalic anhydride; 85 weight percent cyclohexane-1,2-dicarboxylic acid anhydride/15 weight percent tetrahydrophthalic anhydride; 90 weight percent cyclohexane-1,2-dicarboxylic acid anhydride/10 weight percent succinic anhydride; 75 weight percent cyclohexane-1,2-dicarboxylic acid anhydride/25 weight percent Nadic Methyl Anhydride; 75 weight percent cyclohexane-1,2-dicarboxylic acid anhydride/25 weight percent dodecenylsuccinic anhydride; and 70 weight percent methyltetrahydrophthalic anhydride/30 weight percent chlorendic anhydride.

The term "dicarboxylic acid anhydride curing agent" as used herein also is meant to include mixtures of one or more dicarboxylic acid anhydrides and one or more adducts thereof, wherein an adduct is defined herein as the reaction product of an anhydride with a hydroxy-terminated polyester, a polyglycol, or castor oil. However, the amount of such adducts present in the curing agent shall be less than about 50 weight percent, based on the total weight of curing agent employed. Hydroxy-terminated polyesters are readily obtained by known procedures, i.e., the polycondensation of an excess amount of a glycol, such as ethylene glycol; propylene glycol; 1,4-butanediol; 1,4-cyclohexanedimethanol; 1,4-bis(2-hydroxyethoxy)benzene; and the like, with a dicarboxylic acid, such as isophthalic acid, terephthalic acid, succinic acid, adipic acid, and the like. Suitable polyglycols, i.e., aliphatic alcohols containing two or more hydroxy groups, include ethylene glycol; propylene glycol; 1,2-butanediol; 1,3-butanediol; 1,4-butanediol; 3-methyl-1,3-butanediol; 2,3-hexanediol; 3,4-hexanediol; 1,6-hexanediol; 3,4-diethyl-3,4-hexanediol; diethylene glycol and triethylene glycol and higher homologs; glycerine; pentaerythritol; trimethylolethane; trimethylolpropane; trimethylolbutane; and the like.

The amount of curing agent employed will depend both upon the composition of the curing agent and the properties desired in the cured resin. In general, the amount of curing agent employed should provide sufficient anhydride groups and carboxylic acid groups, if present, to react with from about 50 to 100 percent, and preferably with about 60 percent, of the epoxide groups present in the epoxy resin. In estimating the amount of curing agent to be employed, the carboxylic acid groups generated from the reaction of anhydride groups with epoxide groups are not to be considered. That is, the anhydride groups and carboxylic acid groups must be present in the curing agent prior to mixing with the epoxy resin.

As stated hereinbefore, the accelerator consists of a zinc salt of an aliphatic monocarboxylic acid and at least one metal salt of an aliphatic monocarboxylic acid wherein the metal is selected from the group consisting of lithium, manganese, and cobalt. Preferably, only one metal salt is employed in combination with the zinc salt. Said monocarboxylic acid can be saturated or unsaturated, normal or branched, substituted or unsubstituted, and has fewer than about 26 carbon atoms. The monocarboxylate moity of said zinc salt and the monocarboxylate moiety of said metal salt can be the same or different. It is preferred that the same monocarboxylate moiety be employed in each case. Examples of monocarboxylic acids coming within the foregoing general description include formic, acetic, propionic, butyric, valeric, caproic, enanthic, caprylic, pelargonic, capric, undecylic, lauric, tridecanoic, myristic, pentadecanoic, palmitic, margaric, stearic, arachidic, behenic, lignoceric, hyenic, cerotic, 2,3-dimethylvaleric, 3,4-dimethylvaleric, dimethylacetic, isobutyric, 2-methylvaleric, 3-methylvaleric, 3-ethylvaleric, 2-methylhexanoic, 5-methylhexanoic, 2-ethylhexanoic, acrylic, oleic, linoleic, linolenic, propiolic, ricinoleic, phenylacetic, glycolic, lactic, 2-methyl-3-phenylpentanoic, and chloroacetic acids. Preferably, said monocarboxylic acids are unsubstituted. A most preferred group of monocarboxylic acids consists of the normal, saturated aliphatic monocarboxylic acids having from 2 to about 26 carbon atoms.

The ratio of said zinc salt to said metal salt or salts can vary over a wide range, depending upon the curing characteristics desired and the properties of the salts involved. Generally, the ratio of said zinc salt to said metal salts or salts, on a weight basis, will vary from about 1:5 to about 5:1. It is preferred, however, that said zinc salt constitutes at least 50 percent by weight of the accelerator. Thus the preferred ratio of said zinc salt to said metal salt or salts is in the range of from 1:1 to about 5:1. Most preferably, said ratio will vary from about 2:1 to about 5:1.

It is, of course, known in the art to employ individually metal salts of carboxylic acids as catalysts or accelerators for the curing of epoxy resins. For example, cobalt oleate, cadmium stearate, lead stearate, aluminum stearate, and stannous oxalate are disclosed in British 806,188; stannous salts of aliphatic mono- and dicarboxylic acids are disclosed in U.S. 3,117,099 and U.S. 3,201,360; zinc stearate is disclosed in French 1,505,018; and polyvalent metal salts of organic carboxylic acids are disclosed in British 903,933, wherein suitable metals include zinc, aluminum, iron, manganese, lead cobalt, cadmium, barium, chromium, and copper, and suitable carboxylic acids include aliphatic monocarboxylic acids.

However, the prior art use of an individual metal salt of an aliphatic monocarboxylic acid as an accelerator in the curing of epoxy resins is not without disadvantages. Zinc salts of aliphatic monocarboxylic acids in general permit surfaces exposed to air during cure to develop tack, while other metal salts of such acids generally require cure temperatures in excess of about 300 degrees Fahrenheit as a result of low accelerator activity.

The foregoing disadvantages are eliminated by the accelerator admixtures disclosed herein.

The amount of accelerator employed in the compositions of the present invention, while dependent to a large extent upon the curing characteristics desired, generally will vary from about 0.001 to about 0.02 mole of monocarboxylic acid salts per 100 parts of epoxy resin. Preferably, the amount of accelerator will vary from about 0.01 to about 0.02 mole of said salts per 100 parts of epoxy resin.

In carrying out the process of the present invention, said accelerator is mixed with said curing agent at a temperature in the range of from about 200 to about 400 degrees Fahrenheit, preferably under an inert atmosphere to exclude moisture. Within this temperature range, the salts comprising said accelerator dissolve in said curing agent. While the method of mixing is not critical, moderate-speed agitation is preferred. However, satisfactory results are obtained wih manual agitation. When dissolution is complete, the accelerator/curing agent solution is cooled to less than about 100 degrees Fahrenheit. Upon cooling the accelerator is precipitated in a finely-divided state which permits said accelerator to remain dispersed in said curing agent and, more importantly, in the epoxy resin/anhydride system.

Of course, the various prior art methods of mixing may be employed. However, with such methods the accelerator often does not remain dispersed and either settles out or rises to the surface of the blended epoxy resin/anhydride system.

To the cool accelerator/curing agent mixture is added the epoxy resin. Optional components, such as mineral fillers, pigments, air-release agents, flow control agents, and fibrous reinforcement materials also may be added, as known to those skilled in the potting, encapsulating, impregnating, and dipping arts.

Without intending to limit it in any manner, the present invention will be more fully described by the following examples which illustrate certain preferred embodiments. Unless otherwise indicated, all percentages and parts are by weight. The epoxy resins employed in the examples are identified as follows:

Epoxy Resin A—An aliphatic diglycidyl ether having an epoxide equivalent weight of 300–325 and a viscosity at 77 degrees Fahrenheit of 20–150 cps.

Epoxy Resin B—A glycidyl polyether of Bisphenol A having an epoxide equivalent weight of 178–193 and a viscosity at 77 degrees Fahrenheit of 7,000–10,000 cps.

Epoxy Resin C—(3,4-epoxycyclohexyl)methyl 3,4-epoxycyclohexanecarboxylate.

EXAMPLE 1

A mixture of 90 parts of dodecenylsuccinic anhydride and 5 parts of zinc stearate is heated at about 270 degrees Fahrenheit (referred to hereinafter as heat-in temperature) with agitation for about 30 minutes. The resultant solution is cooled to less than 100 degrees Fahrenheit and 100 parts of Epoxy Resin B added with agitation. The resultant epoxy resin/anhydride composition has a gel time of 9 minutes at 300 degrees Fahrenheit and cures tack-free after 2 hours at 300 degrees Fahrenheit. However, after 2 hours at 250 degrees Fahrenheit the air-exposed surfaces of the cured resin exhibit pronounced tack.

EXAMPLE 2

The procedure of Example 1 is repeated with similar results, except that the amount of zinc stearate employed is reduced to 2.5 parts.

EXAMPLE 3

The procedure of Example 1 is repeated with similar results, except that the accelerator consists of 4 parts of zinc stearate and 1 part of zinc acetate, and the accelerator heat-in temperature is increased to about 300 degrees Fahrenheit.

EXAMPLE 4

The procedure of Example 1 is repeated, except that the amount of dodecenylsuccinic anhydride is increased to 118 parts, and the Epoxy Resin B is replaced with 100 parts of Epoxy Resin C. The resultant epoxy resin/anhydride composition has a gel time of 23 minutes at 300 degrees Fahrenheit and cures tack-free after 2 hours at 300 degrees Fahrenheit. However, said composition does not gel after 2 hours at 250 degrees Fahrenheit.

The preceding four examples demonstrate that the use of zinc salts as accelerators, either individually or in combination, does not prevent tack when the resin composition is cured at 250 degrees Fahrenheit. The following six examples demonstrate the efficacy of the accelerators of the instant invention.

EXAMPLE 5

The procedure of Example 3 is repeated, except that the zinc acetate is replaced with an equal amount of lithium stearate. The resultant composition has a gel time of 8 minutes at 300 degrees Fahrenheit and cures tack-free after 2 hours at 250 degrees Fahrenheit.

EXAMPLE 6

The procedure of Example 3 is repeated, except that the zinc acetate is replaced with an equal amount of manganese acetate and the accelerator heat-in temperature is increased to about 340 degrees Fahrenheit. The resultant epoxy resin/anhydride composition has a gel time of 9 minutes at 300 degrees Fahrenheit and cures tack-free after 2 hours at 250 degrees Fahrenheit.

EXAMPLE 7

The procedure of Example 3 is repeated, except that the zinc acetate is replaced with an equal amount of cobalt stearate. The resultant composition cures tack-free after 2 hours at 250 degrees Fahrenheit.

EXAMPLE 8

The procedure of Example 5 is repeated, except that 30 parts of the Epoxy Resin B is replaced with 30 parts of Epoxy Resin A and the accelerator heat-in temperature is about 270 degrees Fahrenheit. After aging for one day, the resultant epoxy resin/anhydride composition has a gel time of 8 minutes at 300 degrees Fahrenheit and cures tack-free after 2 hours at 250 degrees Fahrenheit.

EXAMPLE 9

The procedure of Example 5 is repeated, except that the accelerator heat-in temperature is about 270 degrees Fahrenheit and 35 parts of a poly(propylene glycol) having an average molecular weight of 2000 is added to the mixture after adding the Epoxy Resin B. After aging for one day, the resultant epoxy resin/anhydride composition has a gel time of 8 minutes at 300 degrees Fahrenheit and cures tack-free after 2 hours at 250 degrees Fahrenheit.

EXAMPLE 10

The procedure of Example 4 is repeated, except that the amount of zinc stearate is reduced to 4 parts and 1 part of lithium stearate is added. The resultant composition has a gel time of 11 minutes at 300 degrees Fahrenheit and cures tack-free after 2 hours at 250 degrees Fahrenheit.

The remaining examples illustrate formulations designed for specific end-uses.

EXAMPLE 11

This example describes the preparation of a rigid, one-package electrical potting and impregnating compound characterized by low viscosity, good shelf-life, and excellent electrical properties at elevated temperatures. The volatility of all components is low, enabling the use of reduced pressures as low as 0.5 mm. Hg absolute to insure complete impregnation and the absence of voids. The composition of the compound of this example is given in Table I.

TABLE I

| Material: | Parts |
|---|---|
| Epoxy Resin B | 100 |
| Dodecenylsuccinic anhydride | 90 |
| Zinc stearate | 4 |
| Lithium stearate | 1 |

The following compounding procedure is employed: The dodecenylsuccinic anhydride is heated to about 320 degrees Fahrenheit and the lithium stearate added with agitation. When a solution is obtained, the zinc stearate is added, also with agitation. Under continued agitation, the resultant solution is cooled to less than 100 degrees Fahrenheit and the Epoxy Resin B added. The resultant compound has a viscosity at 77 degrees Fahrenheit of 2,200 cps., a shelf life greater than 3 months (at 77 degrees Fahrenheit), and gel times at 250 and 300 degrees Fahrenheit of 11 minutes and 7 minutes, respectively.

While the compound may be cured at either 300 degrees Fahrenheit for 3 hours or 250 degrees Fahrenheit for 5 hours, cure times of 5 hours and 16 hours, respectively, allow development of ultimate cure properties, summarized in Table II.

TABLE II

| | |
|---|---|
| Cure temperature, °F. | 250 |
| Cure time, hours | 16 |
| Ultimate tensile strength (p.s.i.) | 7,700 |
| Initial modulus (p.s.i.) | $0.40 \times 10^6$ |
| Elongation (percent) | 3.2 |
| Ultimate flexural strength (p.s.i.) | 14,600 |
| Initial modulus (p.s.i.) | $0.44 \times 10^6$ |
| Deflection at failure (inches) | 0.3 |
| Izod impact (ft.-lbs./inch notch) | 0.43 |
| Weight loss, 24 hours at 300° F. (percent) | 0.04 |
| Water absorption, 24 hours at 77° F. (percent) | 0.07 |

The electrical characteristics of the cured compound are summarized in Table III.

TABLE III

| Temperature, °C.: | Volume resistivity, ohm-cm. | Capacitance properties at 60 Hz. Dielectric constant | Capacitance properties at 60 Hz. Dissipation factor |
|---|---|---|---|
| 25 | $1.9 \times 10^{16}$ | 3.26 | 0.013 |
| 40 | | 3.28 | 0.010 |
| 60 | | 3.29 | 0.009 |
| 66 | $4.4 \times 10^{15}$ | | |
| 80 | | 3.25 | 0.001 |
| 93 | $3.4 \times 10^{15}$ | | |
| 100 | | 3.24 | 0.014 |
| 120 | | 3.40 | 0.014 |
| 130 | $1.3 \times 10^{13}$ | | |
| 140 | | 3.28 | 0.013 |
| 150 | $3.7 \times 10^{11}$ | | |
| 160 | | 3.20 | 0.014 |
| 180 | $6.1 \times 10^{10}$ | 3.10 | 0.059 |
| 200 | $5.0 \times 10^{10}$ | 3.06 | 0.080 |

EXAMPLE 12

This example describes the preparation of a calcium carbonate-filled, rigid, one-package electrical potting and encapsulating compound which is similar to the compound described in Example 11. The compound of the instant example has the composition summarized in Table IV.

TABLE IV

| Material: | Parts |
|---|---|
| Epoxy Resin B | 100 |
| Calcium carbonate | 130 |
| Colloidal silica | 1 |
| Dodecenylsuccinic anhydride | 90 |
| Lithium stearate | 1 |
| Zinc stearate | 4 |

The lithium and zinc stearates are dissolved in the dodecenylsuccinic anhydride as described in Example 11. The calcium carbonate (pre-dried) and colloidal silica are dispersed in the Epoxy Resin B under high-speed agitation. The two mixtures then are blended as described in Example 11. The resultant compound has a viscosity at 77 degrees Fahrenheit of 9,900 cps., a shelf life, at 77 degrees Fahrenheit, greater than 3 months, and gel times at 250 and 300 degrees Fahrenheit of 15 minutes and 8 minutes, respectively.

The curing recommendations of Example 11 apply to the present example; Table V summarizes the properties of the cured compound.

TABLE V

| | |
|---|---|
| Cure temperature, °F. | 250 |
| Cure time, hours | 16 |
| Ultimate tensile strength (p.s.i.) | 4,600 |
| Initial modulus (p.s.i.) | $0.57 \times 10^6$ |
| Elongation (percent) | 2.0 |
| Ultimate flexural strength (p.s.i.) | 9,200 |
| Initial modulus (p.s.i.) | $0.71 \times 10^6$ |
| Deflection at failure (inches) | 0.10 |
| Izod impact (ft.-lbs./inch notch) | 0.34 |
| Weight loss, 24 hours at 300° F. (percent) | 0.03 |
| Water absorption, 24 hours at 77° F. (percent) | 0.05 |

The electrical characteristics of the cured compound are summarized in Table VI.

TABLE VI

| | Volume resistivity, ohm-cm. | Capacitance properties at 60 Hz. | |
|---|---|---|---|
| | | Dielectric constant | Dissipation factor |
| Temperature, °C.: | | | |
| 25 | $1.5 \times 10^{16}$ | 3.83 | 0.007 |
| 40 | | 3.85 | 0.002 |
| 60 | | 3.27 | 0.002 |
| 66 | $2.7 \times 10^{15}$ | | |
| 80 | | 3.41 | 0.003 |
| 93 | $1.7 \times 10^{15}$ | | |
| 100 | | 3.88 | 0.013 |
| 120 | | 4.05 | 0.008 |
| 130 | $1.1 \times 10^{14}$ | | |
| 140 | | 3.94 | 0.009 |
| 150 | $3.7 \times 10^{12}$ | | |
| 160 | | 4.02 | 0.014 |
| 180 | $9.0 \times 10^{11}$ | 3.90 | 0.021 |
| 200 | $1.7 \times 10^{11}$ | 3.88 | 0.059 |

EXAMPLE 13

The compound described in the present example is that of Example 11 modified with a low-viscosity flexibilizer for improved thermal shock resistance. The composition of the compound of the present example is summarized in Table VII.

TABLE VII

| Material: | Parts |
|---|---|
| Epoxy Resin A | 40 |
| Epoxy Resin B | 60 |
| Dodecenylsuccinic anhydride | 70 |
| Lithium stearate | 1 |
| Zinc stearate | 4 |

The compounding procedure of Example 11 is employed to give a compound having a viscosity at 77 degrees Fahrenheit of 800 cps., a shelf life greater than 3 months (at 77 degrees Fahrenheit), and gel times at 250 and 300 degrees Fahrenheit of 12 minutes and 7 minutes, respectively.

The curing recommendations of Example 11 also apply to the instant example. The properties of the cured compound are summarized in Table VIII.

TABLE VIII

| | |
|---|---|
| Cure temperature, °F. | 250 |
| Cure time, hours | 16 |
| Ultimate tensile strength (p.s.i.) | 2,000 |
| Elongation (percent) | 42 |
| Izod impact, ft.-lbs./inch notch) | 1.02 |
| Weight loss, 24 hours at 300° F. (percent) | 0.53 |
| Water absorption, 24 hours at 77° F. (percent) | 0.19 |

The electrical characteristics of the cured compound are summarized in Table IX.

TABLE IX

| | Volume resistivity, ohm-cm. | Capacitance properties at 60 Hz. | |
|---|---|---|---|
| | | Dielectric constant | Dissipation factor |
| Temperature, °C.: | | | |
| 25 | $2.9 \times 10^{15}$ | 3.56 | 0.024 |
| 40 | | 3.90 | 0.015 |
| 60 | | 3.25 | 0.009 |
| 66 | $6.8 \times 10^{12}$ | | |
| 80 | | 3.34 | 0.001 |
| 93 | $3.0 \times 10^{11}$ | | |
| 100 | | 3.11 | 0.018 |
| 120 | | 3.00 | 0.149 |
| 130 | $2.1 \times 10^{10}$ | | |
| 140 | | 3.17 | 0.458 |
| 150 | $5.5 \times 10^9$ | | |
| 160 | | 3.34 | 0.707 |
| 180 | $<10^9$ | 4.26 | 1.018 |
| 200 | | (¹) | (¹) |

¹ Off scale.

EXAMPLE 14

The present example describes a calcium carbonate-filled variation of Example 13 and has the composition given in Table X.

TABLE X

| Material: | Parts |
|---|---|
| Epoxy Resin A | 40 |
| Epoxy Resin B | 60 |
| Calcium carbonate | 117 |
| Colloidal silica | 1 |
| Dodecenylsuccinic anhydride | 70 |
| Lithium stearate | 1 |
| Zinc stearate | 4 |

Following the compounding procedure of Example 12, a compound is obtained which has a viscosity at 77 degrees Fahrenheit of 3,600 cps., a shelf life, at 77 degrees Fahrenheit, greater than 3 months, and gel times at 250 and 300 degrees Fahrenheit of 17 minutes and 12 minutes, respectively.

The curing recommendations of Example 11 apply to the present example. The properties of the cured compound are summarized in Table XI.

TABLE XI

| | |
|---|---|
| Cure temperature, °F. | 250 |
| Cure time, hours | 16 |
| Ultimate tensile strength (p.s.i.) | 1,800 |
| Elongation (percent) | 19 |
| Izod impact (ft.-lbs./inch notch) | 0.35 |
| Weight loss, 24 hours at 300° F. (percent) | 0.29 |
| Water absorption, 24 hours at 77° F. (percent) | 0.12 |

The electrical characteristics of the cured compound are summarized in Example XII.

TABLE XII

| | Volume resistivity, ohm-cm. | Capacitance properties at 60 Hz. | |
|---|---|---|---|
| | | Dielectric constant | Dissipation factor |
| Temperature, °C.: | | | |
| 25 | $2.4 \times 10^{15}$ | 4.39 | 0.006 |
| 40 | | 4.69 | 0.006 |
| 60 | | 5.01 | 0.007 |
| 66 | $8.5 \times 10^{12}$ | | |
| 80 | | 4.98 | 0.005 |
| 93 | $4.1 \times 10^{11}$ | | |
| 100 | | 4.81 | 0.027 |
| 120 | | 4.64 | 0.119 |
| 130 | $3.3 \times 10^{10}$ | | |
| 140 | | 4.69 | 0.194 |
| 150 | $1.3 \times 10^{10}$ | | |
| 160 | | 5.01 | 0.378 |
| 180 | $6.5 \times 10^9$ | 7.05 | 0.676 |
| 200 | $<10^9$ | (¹) | (¹) |

¹ Off scale.

It is to be understood that the foregoing detailed description is given merely by way of illustration and that many variations may be made therein without departing from the spirit and scope of the invention.

Having thus disclosed the invention, what is claimed is:

1. A room temperature-stable, heat-curable composition, which cures tack-free and which comprises:
   (a) an epoxy resin portion containing at least one epoxy resin with more than one 1,2-epoxide group, and having a viscosity at 77 degrees Fahrenheit of less than about 200,000 cps.,
   (b) a curing agent portion containing at least one dicarboxylic acid anhydride, and having a melting point below about 212 degrees Fahrenheit, and
   (c) an accelerator portion,
wherein,
   (1) said epoxy resin is selected from the group consisting of glycidyl ethers of polyhydric phenols, glycidyl ethers of polyhydric alcohols, and epoxidized cycloaliphatic olefins and derivatives,
   (2) said dicarboxylic acid anhydride is aliphatic cycloaliphatic, or aromatic, and contains one anhydride group,
   (3) said accelerator portion is a mixture of a zinc salt of an aliphatic monocarboxylic acid having fewer than about 26 carbon atoms and at least one metal salt of an aliphatic monocarboxylic acid having fewer than about 26 carbon atoms wherein the metal is selected from the group consisting of lithium, manganese, and cobalt, and
      (a) the weight ratio of said zinc salt to said metal salt(s) is in range of from about 1:5 to about 5:1,
   (4) the amount of (b) employed will provide sufficient anhydride groups and carboxylic acid groups, if present, to react with from about 50 to 100 percent of the epoxide groups in (a), and
   (5) the amount of (c) employed will provide from about 0.001 to about 0.02 mole of said zinc and metal salts per 100 parts of (a).

2. The composition of claim 1 wherein up to about 50 weight percent of curing agent portion has been adducted with a hydroxy-terminated polyester, a polyglycol, or castor oil.

3. The composition of claim 1 wherein the weight ratio of said zinc salt to said metal salt(s) is in the range of from 1:1 to about 5:1, and the amount of said accelerator portion is sufficient to provide from about 0.01 to about 0.02 mole of said zinc and metal salts per 100 parts of said epoxy resin portion.

4. The composition of claim 3 wherein said epoxy resin portion is a glycidyl ether of a dihydric phenol.

5. The composition of claim 4 wherein said glycidyl ether is the glycidyl polyether of 2,2-bis(4-hydroxyphenyl)propane having an epoxide equivalent weight of 170–200.

6. The composition of claim 5 wherein said curing agent portion is dodecenylsuccinic anhydride.

7. The composition of claim 6 wherein said accelerator portion is a mixture of zinc stearate and lithium stearate in a weight ratio of 4:1.

8. The composition of claim 6 wherein said accelerator portion is a mixture of zinc stearate and manganese acetate in a weight ratio of 4:1.

9. The composition of claim 6 wherein said accelerator portion is a mixture of zinc stearate and cobalt stearate in a weight ratio of 4:1.

10. The composition of claim 3 wherein said epoxy resin portion consists of a glycidyl ether of a dihydric phenol and a glycidyl ether of a dihydric alcohol, wherein the glycidyl ether of a dihydric alcohol constitutes less than about 60 weight percent of said epoxy resin portion.

11. The composition of claim 10 wherein said glycidyl ether of a dihydric phenol is the glycidyl polyether of 2,2-bis(4-hydroxyphenyl)propane having an epoxide equivalent weight of 170–200.

12. The composition of claim 11 wherein said curing agent portion is dodecenylsuccinic anhydride.

13. The composition of claim 12 wherein said accelerator portion is a mixture of zinc stearate and lithium stearate in a weight ratio of 4:1.

References Cited
UNITED STATES PATENTS

| | | | |
|---|---|---|---|
| 3,578,633 | 5/1971 | Rossa | 260—47 |
| 3,528,935 | 9/1970 | Marion | 260—18 |
| 2,803,609 | 8/1957 | Schlenker | 260—47 |
| 3,487,027 | 12/1969 | Case | 260—2 |
| 3,506,598 | 4/1970 | Groff et al. | 260—2 |

WILLIAM H. SHORT, Primary Examiner

T. E. PERTILLA, Assistant Examiner

U.S. Cl. X.R.

117—128, 161 ZB; 161—186; 260—2 EC, 30.4 Ep, 37 Ep, 47 EC, 59, 78.4 Ep, 830 TW